(12) United States Patent
Coupland

(10) Patent No.: US 9,340,424 B2
(45) Date of Patent: May 17, 2016

(54) CATALYST STRUCTURES

(71) Applicant: Johnson Matthey PLC, London (GB)

(72) Inventor: Duncan Roy Coupland, High Wycombe (GB)

(73) Assignee: Johnson Matthey PLC, London (GB)

( * ) Notice: Subject to any disclaimer, the term of this patent is extended or adjusted under 35 U.S.C. 154(b) by 0 days.

(21) Appl. No.: 14/618,229

(22) Filed: Feb. 10, 2015

(65) Prior Publication Data

US 2015/0191353 A1    Jul. 9, 2015

Related U.S. Application Data

(62) Division of application No. 13/578,121, filed as application No. PCT/GB2011/050047 on Jan. 13, 2011, now Pat. No. 8,980,785.

(30) Foreign Application Priority Data

Feb. 12, 2010    (GB) .................................. 1002378.6

(51) Int. Cl.

| | |
|---|---|
| *B01J 23/00* | (2006.01) |
| *B01J 23/42* | (2006.01) |
| *B01J 23/74* | (2006.01) |
| *C01B 21/26* | (2006.01) |
| *B01J 19/30* | (2006.01) |

(52) U.S. Cl.
CPC ............... *C01B 21/265* (2013.01); *B01J 19/30* (2013.01); *B01J 19/305* (2013.01); *B01J 2219/3085* (2013.01); *B01J 2219/3086* (2013.01); *B01J 2219/30223* (2013.01); *B01J 2219/30226* (2013.01); *B01J 2219/30246* (2013.01); *B01J 2219/30475* (2013.01); *Y10T 428/24273* (2015.01); *Y10T 428/24942* (2015.01)

(58) Field of Classification Search
CPC .......... B01J 23/63; B01J 23/40; B01J 23/462; B01J 23/58; B01D 53/945; B01D 53/8634; B01D 53/58; B01D 2257/406; B01D 53/34; C01C 1/12
USPC ......................................... 502/339, 338, 325
See application file for complete search history.

(56) References Cited

U.S. PATENT DOCUMENTS

| | | | |
|---|---|---|---|
| 3,415,737 | A | 12/1968 | Kluksdahl |
| 5,699,680 | A | 12/1997 | Guerlet et al. |

FOREIGN PATENT DOCUMENTS

| | | |
|---|---|---|
| DE | 34 07 866 A1 | 9/1985 |
| EP | 0 364 153 B1 | 4/1990 |
| EP | 0 946 290 B1 | 10/1999 |
| FR | 2 904 032 A1 | 1/2008 |

(Continued)

OTHER PUBLICATIONS

Kapteijn et al., Heterogeneous catalytic decomposition of nitrous oxide, *Applied Catalysis B: Environmental*, 1996, vol. 9, pp. 25-64.

(Continued)

*Primary Examiner* — Colleen Dunn
*Assistant Examiner* — Haytham Soliman
(74) *Attorney, Agent, or Firm* — RatnerPrestia

(57) ABSTRACT

A catalyst structure suitable for use in an ammonia oxidation process is described including a plurality of shaped catalyst units supported on one or more members in a spaced relationship that allows the structure to flex.

14 Claims, 2 Drawing Sheets

(56) References Cited

FOREIGN PATENT DOCUMENTS

| | | |
|---|---|---|
| GB | 2 064 975 A | 6/1981 |
| GB | 2 096 484 A | 10/1982 |
| JP | 8-301602 A | 11/1996 |
| WO | WO-98/28073 A1 | 7/1998 |
| WO | WO-02/02230 A1 | 1/2002 |
| WO | WO-03/011448 A1 | 2/2003 |
| WO | WO-2004/096702 A2 | 11/2004 |
| WO | WO 2004/096703 A2 | 11/2004 |

OTHER PUBLICATIONS

International Search Report dated Jun. 10, 2011, from PCT International Application No. PCT/GB2011/050047.

International Preliminary Report on Patentability dated Aug. 14, 2012, from PCT International Application No. PCT/GB2011/050047.

CATALYST STRUCTURES

CROSS-REFERENCE TO RELATED APPLICATIONS

This application is divisional of U.S. application Ser. No. 13/578,121, filed Oct. 31, 2012 which is a U.S. National Phase application of PCT International Application No. PCT/GB2011/050047, filed Jan. 13, 2011, and claims priority of British Patent Application No. 1002378.6, filed Feb. 12, 2010, the disclosures of which are incorporated herein by reference in their entireties for all purposes.

FIELD OF THE INVENTION

This invention relates to catalyst structures used in fixed bed arrangements and in particular catalyst and fixed bed arrangements used in ammonia oxidation processes.

BACKGROUND OF THE INVENTION

Ammonia oxidation processes to produce nitric acid and hydrogen cyanide using precious metal gauze catalysts are well established. In the manufacture of nitric acid, ammonia is oxidised with air to nitric oxide, while in the manufacture of hydrogen cyanide a mixture of ammonia and methane (often as natural gas) is oxidised with air. Both are typically performed by contacting the gases with a precious metal catalyst often in the form of a gauze prepared from platinum or a platinum-alloy. In both processes, the gas mixture is passed at an elevated temperature (e.g. 800 to 1000° C.) over a catalyst to effect the oxidation.

Recently, improvements in base-metal catalysts have offered alternatives to precious metals with the added benefit of producing low levels of nitrous oxide, which is a potent greenhouse gas.

Particulate ammonia oxidation catalysts based on cobalt mixed metal oxides, such as those described in WO98/28073, have proven capable of performing this task with excellent efficiency and the desired selectivity. The catalytic oxidation of ammonia is very fast, so the particulate beds are typically less than 500 mm thick. In such beds, maintaining a uniform distribution of pellets and hence of gas flow through the bed can be difficult. This arises from various factors, including plant vibration and variable thermal profiles across the catalyst, but predominantly is due to the effect of the substantial change in diameter of the reaction vessels, as they change temperature from ambient to operating conditions above 850° C. and then back again on shut down. The frequency of such shut downs, can be relatively high, with a consequent effect arising, potentially cumulatively, on each cycle. The effect of severe bed thinning can occur in particular around the periphery of the catalyst bed where the resulting bypass of ammonia can reduce process efficiency below an economic level, as well as increasing emissions of greenhouse gases and, in severe cases, produce an explosion hazard.

This problem has been successfully solved using special catalyst support baskets for instance as described in WO03/011448. These counteract the detrimental effects of expansion and contraction of the catalyst bed structure. They are however, complex to fabricate and need to be carefully sealed within the reaction vessel to avoid gaps that can themselves promote gas bypass.

A stable, thin bed of pelletised catalyst, capable of achieving the high selectivity for the desired oxidation product, without either excessive pressure drop across it or bypass around or through it, is therefore extremely desirable.

Moreover, with metal oxide-based ammonia oxidation catalysts it has been found that careful attention to the start-up process, also known as light-off, is required to ensure the catalytic reaction is established at or very close to the top of the bed to reduce risk of quenching resulting from the relatively low thermal conductivity of the catalyst compared with precious metal gauzes. A similar quenching effect may also be observed where the feed gases contain appreciable amounts of sulphur compounds, which can poison cobalt-based catalysts. While this may be solved in some circumstances using hybrid arrangements of precious metal gauzes in combination with particulate ammonia oxidation and/or nitrous oxide abatement catalysts as described for example in WO04/096703 and WO04/096702, there remains a need to improve the metal oxide catalyst light-off ability and resistance to poisoning.

SUMMARY OF THE INVENTION

Accordingly, the present invention provides a catalyst structure suitable for use in an ammonia oxidation process comprising a plurality of shaped catalyst units supported on one or more members in a spaced relationship that allows the structure to flex.

The invention further provides the use of the flexible catalyst structure in an ammonia oxidation process.

BRIEF DESCRIPTION OF THE DRAWINGS

The invention is further illustrated by reference to the drawings in which.

DETAILED DESCRIPTION OF THE INVENTION

Figure 1:
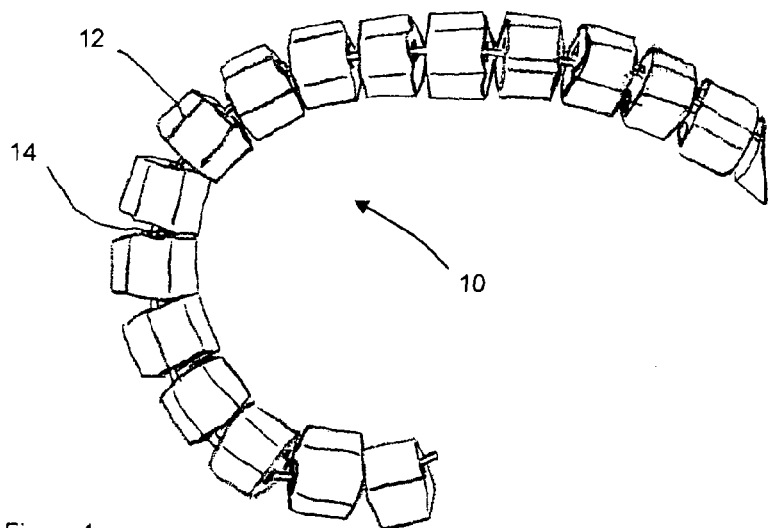
FIG. 1 depicts a linear catalyst structure according to an embodiment of the present invention in which a plurality of shaped catalyst units are supported on a wire, which is fed through a through-hole in each of the pellets.

The supported shaped catalyst units of the present invention may be pellets, spheres, rings, cylinders, extrudates, and the like, which may be single- or multi-holed and lobed or fluted. Pelleted catalysts are preferred as they have higher strength. The shaped units typically have maximum and minimum dimensions, i.e. width and length, in the range 1.5 to 20 mm, particularly 3 to 10 mm. The aspect ratio of the shaped units, i.e. the ratio of the maximum to minimum dimensions, is preferably less than 3. Two or more different catalyst particle sizes may advantageously be used to control the flow of gases through the catalyst bed or alter the flexibility of the catalyst structure. These properties may also be controlled using lobed or fluted catalyst shapes that may be designed to inter-lock. Most desirably, the supported shaped units have one or more, e.g. up to 10, through-holes arranged symmetrically to maximise the strength. The through holes increase the geometric surface area of the catalyst and also allow the catalyst units to be "strung" on the supporting member or members. The catalyst units may be free to move along the elongate support member or may be fixed in place using an inert cement or other means. Cylindrical pellets having 1-5 through holes and optionally 3-5 lobes or flutes running along the length of the exterior of the cylinder are most preferred.

The invention may be applied to any particulate catalyst. However, preferably the particulate catalyst is an ammonia oxidation catalyst, a nitrous oxide decomposition catalyst, or a mixture thereof. In addition, particulate inert materials, such as alpha alumina or other inert refractory oxide, may be included in the structure.

In one embodiment, the particulate catalyst is an ammonia oxidation catalyst. The ammonia oxidation catalyst may comprise a platinum group metal (PGM) catalyst, such as a Rh- and/or Ir-based catalyst, or may comprise a base metal or base metal oxide, especially where the base metal is a transition metal or a rare earth metal, and may, for example, comprise one or more of iron, nickel, copper, cobalt, manganese, silver, or supported platinum, palladium or ruthenium. The catalyst may also comprise a mixture of one or more base metals with one or more precious metals. Hence, ammonia oxidation catalysts suitable for use in the present invention include cobalt-containing and non-cobalt-containing ammonia oxidation catalysts and mixtures of these. Included within these are supported PGM catalysts, $La_2O_3$, $Co_3O_4$ optionally with minor quantities of $Li_2O$, spinels, such as $CoAl_2O_4$, substituted $ABO_3$ materials, perovskites, such as $LaCoO_3$, including $LaCoO_3$ in which partial substitution (e.g. up to 20 mole %) of the A-site has been made by e.g. Sr or Ce, or partial substitution (e.g. up to 50 mole %) of the B-site has been made by e.g. Cu, $La_2CoO_4$, $Co_3O_4$ supported on alumina, thoria, ceria, zinc oxide or calcium oxide, $Co_3O_4$, or $Bi_2O_3$ promoted by rare earth elements or thorium, and optionally containing one or more of oxides of Mn, Fe, Mg, Cr or Nb, $CoO_x$ with Pt on a support. Particularly suitable catalyst supports include refractory oxides such as alumina, titania and zirconia and mixtures thereof.

In another embodiment the catalyst structure comprises a particulate nitrous oxide decomposition catalyst. Preferably, a particulate nitrous oxide decomposition catalyst is provided in the reactor at the ammonia oxidation stage to decompose the nitrous oxide by conversion of the nitrous oxide to either (a) nitrogen by catalytic reduction or (b) nitric oxide by catalytic oxidation according to the following equations;

$$N_2O \rightarrow 2N_2 + \tfrac{1}{2}O_2 \quad (a)$$

$$2N_2O + O_2 \rightarrow 4NO. \quad (b)$$

The nitrous oxide decomposition catalyst may be a supported metal, a pure or mixed metal oxide or a zeolitic system (for example those described on pages 30-32 of Kapteijn et al., *Applied Catalysis B: Environmental*, 9 (1996) pages 25-64 and the references provided therein). Supported metal nitrous oxide abatement catalysts that may be used in the present invention include one or more of rhodium, ruthenium, palladium, chromium, cobalt, nickel, iron, and copper on shaped units of oxides of alkaline earth metals, e.g. magnesium (Mg) or calcium (Ca), alumina, silica, titania, or zirconia. The metal loading in the supported metal nitrous oxide decomposition catalysts will depend upon the activity of the metal and the nature of the support used. The metal loading may be 1% by weight or less, but may be greater than 20% by weight. The supported metal catalyst may form oxide phases on the support under the reaction conditions. Hence, suitable nitrous oxide decomposition catalysts include oxides of rhodium (Rh), iridium (Ir), cobalt (Co), iron (Fe), nickel (Ni), copper Cu(II), lanthanum (La), calcium (Ca), strontium (Sr), vanadium V(III), hafnium (Hf), manganese Mn(III), cerium (Ce), thorium (Th), tin (Sn), chromium (Cr), magnesium (Mg), zinc (Zn), and cadmium (Cd), preferably, Rh, Ir, Co, Fe and Ni. Supported metal oxides that may be used in Ito the present invention include any of the above pure oxides, particularly oxides of Fe, Cr(III), Mn(III), Rh, Cu and Co supported on oxides of alkaline earth metals e.g. magnesium or calcium, alumina, silica titania, zirconia or ceria. Preferably the supported oxide comprises between 0.5 and 50% by weight of the pure metal oxide catalyst.

Mixed metal oxides effective as nitrous oxide decomposition catalysts include doped-oxides or solid solutions, spinels, pyrochlores, and perovskites. Other useful mixed oxide catalysts that may be used in the process of the present invention include transition metal-modified hydrotalcite structures containing Co, Ni, Cu, La, Mg, Pd, Rh, and Ru and solid solutions comprising Co(II) oxide and Mn(III) oxide in magnesia or alumina. However preferred mixed oxide nitrous oxide decomposition catalysts are spinels and perovskites. Spinel catalysts that may be used in the present invention may be of formula $M^1M^2O_4$ wherein $M^1$ is selected from Co, Cu, Ni, Mg, Zn, and Ca, $M^2$ is selected from Al, Cr, or Co (and thus also includes $Co_3O_4$), $Cu_xCo_{3-x}O_4$ (where x=0-1), $Co_xMg_{1-x'}Al_2O_4$ (where x'=0-1), $Co_{3-x''}Fe_{x''}O_4$, or $Co_{3-x''}Al_{x''}O_4$ (where x''=0-2). A preferred nitrous oxide abatement catalyst is described in WO 02/02230. The catalyst comprises 0.1-10 mol % $Co_{3-x}M_xO_4$ where M is Fe or Al and x=0-2, on a cerium oxide support. The catalyst may also contain 0.01-2 weight % $ZrO_2$. A suitable non-Co containing spinel catalyst is $CuAl_2O_4$.

Perovskite nitrous oxide decomposition catalysts may be represented by the general formula $ABO_3$ wherein A may be selected from La, Nd, Sm and Pr, B may be selected from Co, Ni, Cr, Mn, Cu, Fe, and Y. Partial substitution of the A-site (e.g. up to 20 mol %) may be performed with divalent or tetravalent cations, e.g. $Sr^{2+}$ or $Ce^{4+}$, to provide further useful nitrous oxide decomposition catalysts. In addition, if desired, partial substitution of one B-site element (e.g. up to 50 mol %) with another may be performed to provide further useful nitrous oxide decomposition catalysts. Suitable perovskite catalysts include $LaCoO_3$, $La_{1-x}Sr_xCoO_3$, $La_{1-x}Ce_xCoO_3$ (where x≤0.2), and $LaCu_yCo_{1-y}O_3$ (where y≤0.5).

Preferred nitrous oxide decomposition catalysts are supported Rh catalysts and supported or unsupported pure and mixed metal oxides of one or more of Co, Mn, Fe, Cu, Cr, and Ni, preferably Co in a spinel perovskite structure.

In a preferred embodiment, the nitrous oxide decomposition catalyst is also an effective ammonia oxidation catalyst. Accordingly, the use of a catalyst that not both as an ammonia oxidation catalyst and as a nitrous oxide decomposition catalyst offers practical advantages in catalyst assembly design and construction. Hence a particularly preferred catalyst is a particulate composition containing oxides of cobalt and other metals, particularly rare earths, for example as described in EP-B-0946290. The preferred catalyst comprises oxides of (a) at least one element Vv selected from cerium and praseodymium and at least one element Vn selected from non-variable variable rare earths and yttrium, and (b) cobalt, said cobalt and elements Vv and Vn being in such proportions that the (element Vv plus element Vn) to cobalt atomic ratio is in the range 0.8 to 1.2, at least some of said oxides being present as a mixed oxide phase with less than 30% of the cobalt (by atoms) being present as free cobalt oxides. Preferably less than 25% (by atoms) of the is cobalt is present as free cobalt oxides, and in particular it is preferred that less than 15% (by atoms) of the cobalt is present as the cobalt monoxide, CoO. The proportion of the various phases may be determined by X-ray diffraction (XRD) or by thermogravimetric analysis (TGA) making use, in the latter case, of the weight loss associated with the characteristic thermal decomposition of $Co_3O_4$ which occurs at approximately 930° C. in air. Preferably less than 10%, particularly less than 5%, by weight of the composition is free cobalto-cobaltic oxide and less than 2% by weight is free cobalt monoxide.

Thus, there may be a Perovskite phase, e.g. $VnCoO_3$ or $VvCoO_3$, mixed with other phases such as $Vv_2O_3$, $Vn_2O_3$, $(Vv_xVn_{1-x})_2O_3$, or $VvxVn_{1-x}O_2$. A particularly preferred catalyst is a $La_{1-x}Ce_xCoO_3$ material. Such catalysts may be prepared according to examples 2 and 3 of EP-B-0946290, which is incorporated herein by reference.

The shaped catalyst units are supported on one or more members in a spaced relationship that allows the structure to flex.

It is preferred that the shaped catalyst units are supported on one or more elongate supporting members, which are suitably flexible, such that the structure may flex. Suitable flexible members are metal or ceramic wires, which may be wound into cables of suitable diameter for use as catalyst supports. The catalyst units may be conveniently supported internally by "stringing" them onto the supporting member in a spaced relationship, to form a linear structure, e.g. akin to a string of pearls, in which the support member passes through the catalyst units. Support members may run both externally and internally. For example, with single holed-pellets, a steel support wire may run internally through the holes in the pellets and, if desired in addition, one or more precious metal wires may be wound around the exterior surfaces of the pellets, e.g. in a groove or grooves along their exterior surfaces. Furthermore, two or more support members may pass through adjacent holes in multi-holed catalyst units to increase strength or allow fabrication of more complex structures.

Where elongate catalyst shapes are used, the catalyst units are preferably supported on the support member with the support co-axial to the longest dimension. Thus cylindrical catalyst units are preferably supported along their length with the ends of adjacent units facing each other.

By the term "in a spaced relationship" we mean that adjacent catalyst shaped units are separated by a distance that allows the catalyst structure to flex, i.e. that allows it to bend. The separation of adjacent shaped units depends on the sizes of the shaped units but may be in the range 1-10 mm. Where the catalyst units are in dose proximity to each other, e.g. where the separation of adjacent units is less that the unit diameter, it is possible to use catalyst shapes that allow the structure to flex, such as by chamfering the edges of cylindrical shaped units or using domed shapes, including spheres. In this way the risk of damage to the catalyst units and the formation of fines/dust may be reduced.

The linear structures or "catalyst strings" may be used in a number of ways in the reaction vessel to overcome the problems of the existing catalyst beds.

Two or more of the linear catalyst structures may be connected to each other to form a sheet or mat structure and two or more mat structures may be arranged in layers to form three-dimensional 'bed' structures. The same or different catalysts may be combined in various arrangements using combinations of linear structures having different properties. In this way mixed catalyst structures may be used with new and improved performance, but which are more readily separated than loose particulate mixed beds.

In the sheet structure, the support members may be aligned such that they are parallel or perpendicular to each other, which may offer additional strength. If desired the linear structures may also be interwoven to further increase the strength of the catalyst structure. Alternatively, or additionally, the support members in the sheet and bed structures may be connected to each other by connectors, such as wire staples or the like, to further strengthen the structure.

The support members, and connectors if used, may be suitably made from the high-temperature-stable steels used currently in the fabrication of the catalyst bed equipment. Alternatively or in addition, for ammonia oxidation catalysts, one or more precious metal or precious metal alloys may be present in the support member. Using metal supports and connectors improves the heat transfer within the catalyst structure. The catalyst structure may be designed to leave exposed sections of metallic support member, which will heat up quickly and transfer heat to the supported shaped catalyst units. In ammonia oxidation, this may improve the catalyst light off and activity/selectivity at start-up. In particular, a more rapid light off may be achieved by supporting at least some of the shaped catalyst units on a support member, either in the form of a wire or cable, which comprises a platinum alloy. The use of platinum alloy supports and connectors may also improve resistance to poisoning, particularly by sulphur. Hence using support members and connectors comprising platinum or a platinum alloy offers the possibility of increasing the catalyst activity. Using a support member comprising palladium or a palladium alloy may also allow the catalyst structure to capture platinum from upstream platinum gauzes, if used.

Whereas the linear structures or mats of catalyst pellets may be directly deployable in a reactor for controlling bypass in existing loose catalyst fixed bed configurations of catalyst, for thin bed catalysis, they are desirably fixed using connectors, such as wire staples, to a support mesh of sufficient strength to enable easy installation and stability to allow removal at the end of service of the catalyst. A suitable mesh may be made of steel, platinum, a platinum alloy, or a palladium alloy and may comprise a single layer or a plurality of layers.

The staples or wires used to fix the linear structures or mats to the support mesh may also be a catalytically active platinum alloy to improve ease of light off and resistance to poisoning.

The linear structures may be deployed as coils, either tightly wound or with spacing defined by other functionality. One key attribute of this design is that the support mesh may be installed into the reactor in the same fashion as would a knitted or woven platinum gauze pack such as is commonly used for ammonia oxidation. The thermal expansion of the mesh may then follow that of the reaction vessel, and as a result of the fixtures would ensure the linear structures of catalyst units also follow the various expansion and contraction cycles of plant start up, service and shut down, ensuring even spacing and distribution of the catalyst for the whole campaign, and providing a basis for elimination of incomplete reaction resulting from gas bypass or streaming. Alternatively, two- and three-dimensional mats of catalyst pellets may be fixed to the interior wall of the reactor or catalyst bed supporting structure, ensuring the same simple means of maintaining catalyst density at the periphery of the bed. Additional certainty of avoidance of bypass may be given by incorporating a rim of solid metal, fixed to the inside of the reaction vessel or catalyst bed support structure and extending in towards the center.

The catalyst structures of the present invention also offer the ability to more readily recover the catalyst units from the reactor and, if different catalysts have been used, separate them for metal recovery and/or recycling.

Furthermore, using a catalytically active supporting mesh for the catalyst structures may provide a "fail safe" catalyst arrangement in ammonia oxidation reactors. Once the thickness of the particulate catalyst bed has been increased beyond the minimum required for full completion of the desired chemical reaction, the underlying metallic catalyst will take little or no part in the primary reaction and so will be unaffected. Normally in the case of ammonia oxidation using platinum group metal alloy gauzes, the gauzes actively catalysing the reaction are severely re-structured, weakening them, causing them to lose weight and giving them limited life. If these, or similar alloys, were present downstream of the particulate catalyst as part or the whole of the support mesh, they would not normally be catalytically active and would therefore not degrade. Therefore until they were required for "emergency catalysis" to avoid the potentially dangerous passing of unreacted ammonia in the downstream part of the chemical plant, they would remain viable and strong. Operating costs may be reduced substantially as a result. This system thus offers an emergency failsafe situation suitable for optimum plant operation, such as might be required in the event of dramatic and complete poisoning/degradation of the whole bed of particulate ammonia oxidation catalyst.

The invention further includes a fixed catalyst bed comprising one or more catalyst structures comprising a plurality of shaped catalyst units supported on one or more members in a spaced relationship that allows the structure to flex.

In a fixed bed, the catalyst strings, which may be constrained on a mesh or mesh pack may be covered with multiple layers of strings either mesh constrained or not, or two or three dimensional mats or loose pellets. In this latter scenario, the pellet size may be selected to match a predefined spacing of the constrained string- or mat-structure, such that the spacing limits movement of the loose pellets to control and maintain the density of the pellet bed across the whole catalyst area, and so maintain even gas flow and optimised catalytic behaviour across the bed. Thus the fixed bed may comprise one or more of the linear catalyst structures and a plurality of loose catalyst pellets. The loose catalyst pellets may be the same or different in composition and/or shape and/or size to the supported shaped catalyst units. The loose catalyst pellets may be solid or have one or more through-holes and typically have maximum and minimum dimensions, i.e. width and length, in the range 1.5 to 20 mm, particularly 3 to 10 mm. The aspect ratio of the loose catalyst pellets, i.e. the ratio of the maximum to minimum dimensions, is preferably less than 3. The design of the fixed bed can be utilised to maximise catalytic reaction with minimum pressure drop of gas as it passes through the bed. In one embodiment solid cylindrical catalyst pellets with a diameter in the range 0.5-2D, where D is the diameter of the supported shaped catalyst unit, are combined with the catalyst structure to form a catalyst bed.

It may be possible to construct thinner beds than those typically employed for loose particulate catalysts alone using the catalyst structure of the present invention. Thin beds (<300 mm deep, preferably <150 mm deep) may offer reduced pressure drop and may be easier to install in existing ammonia oxidation reactors.

The deployment of linear structures or mats of supported particulate catalyst has a further major advantage over loose beds of catalyst pellets. These latter depend on the underlying support grid to maintain them in position. However these are subject to warping that can promote thinning of the catalyst beds. They are also susceptible to separation of the individual strands of wire making them up, caused by mechanical and thermo-mechanical effects. This can in extreme cases cause local, but potentially extensive formation of holes through which the loose pellets can be lost into the bowels of the reaction chamber. This is undesirable both from a contamination perspective and the fact that the catalytic pellets may be capable of promoting undesirable chemical reaction down stream of the primary reaction zone. Local loss of catalyst could also promote gas streaming, i.e. bypass of the catalyst bed, with significant loss of reaction efficiency. The use of string or mats in regions particularly prone to structural change of the support can reduce this problem significantly; both maintaining conversion efficiency and relative pack longevity. This same benefits, in particular the ability of the bed to expand and contract without peripheral thinning, but even more clearly defined, arises where the whole bed consists of the linear and/or mat catalyst structures.

Whereas the catalyst structure may be used in a reaction vessel with particulate ammonia oxidation and/or nitrous oxide decomposition catalyst only, it is preferred that the particulate catalyst is used in combination with a precious metal ammonia oxidation catalyst. Accordingly, the invention includes a catalyst combination comprising a precious metal ammonia oxidation catalyst gauze and a catalyst structure comprising a plurality of shaped ammonia oxidation catalyst particles and/or nitrous oxide decomposition catalyst particles supported on one or more members in a spaced relationship that allows the structure to flex.

Precious metal gauzes may be formed by weaving or knitting or otherwise forming precious metal filaments into a gauze-like structure. Such catalyst gauzes are well established and may consist of platinum or platinum alloy filaments of thickness from 0.02 to 0.15 mm woven to provide rectangular interstices, knitted to provide a regular looped structure or simply agglomerated to provide a non-woven irregular structure. Herein the term "filament" is meant to include wires that have a substantially circular cross-section and also wires that are flattened or otherwise shaped and thereby have a non-circular cross section. Woven gauzes are well established and typically comprise 0.076 mm diameter wire, woven to provide 1024 apertures per square centimeter and prepared to a specific weight per unit area dependant upon the wire composition. Knitted gauzes offer a number of advantages in terms of catalyst physical properties, catalyst activity and lifetime. Knitted gauzes comprise a regular looped structure and may be formed using wire with diameters in the same range as woven materials, in a variety of shapes and thicknesses using variety of stitches such as tricot, jacquard, satin stitch (smooth sunk loops) and raschel. EP-B-0364153, page 3, line 5 to line 56 describes knitted gauzes of particular use in the present invention. Non-woven gauzes are described for example in GB 2064975 and GB 2096484.

The precious metal ammonia oxidation catalyst is preferably platinum (Pt) or a platinum alloy, such as an alloy of platinum with rhodium (Rh) and/or palladium (Pd). Such alloys may contain $\geq 50\%$ preferably $\geq 85\%$ Pt by weight. For example, alloys often used in ammonia oxidation in the production of nitric acid or hydrogen cyanide include 10% Rh 90% Pt, 8% Rh 92% Pt, 5% Pd 5% Rh 90% Pt, and 5% Rh 95% Pt. Alloys containing up to about 5% of iridium (Ir) may also be used in the present invention. The precious metal catalyst may desirably be formulated to reduce nitrous oxide by-product formation, and may thus have an increased rhodium (Rh) or palladium (Pd) content, or may contain other components, such as cobalt (Co). In particular high Pd alloys, comprising 35-45% Pd, 65-55% wt Pt, and 0-5% wt Rh by weight may be used in at least part of the gauze pack to provide a stable, low $N_2O$ catalyst arrangement.

In a conventional nitric acid plant, the number of gauzes employed depends on the pressure at which the process is operated. For example in a plant operating at low pressure, e.g. up to about 5 bar abs., typically <10, often 3 to 6 gauzes may be employed, while at higher pressures, e.g. up to 20 bar abs., a greater number of gauzes, typically >20, often 35-45, may be employed. The gauzes, which are normally circular, may be incorporated individually into the reactor or may be pre-formed into a pad comprising a number of gauzes that may be welded at their periphery. The pad may comprise a combination of woven and knitted or possibly non-woven gauzes whose elemental composition may be the same or different. If adjacent woven gauzes are present, to facilitate replacement, they are preferably arranged so that their warps or wefts are at an angle of 45° to each other. Angular displacement, suitably at 90°, may also be used between adjacent woven gauzes to reduce opportunities for gas channelling.

Catchment gauzes based on palladium are also desirably used in ammonia oxidation plants to act as so-called "getters" or collectors of 'vaporised' platinum lost by chemical action, evaporation, or mechanical losses from the precious metal catalyst. Such catchment gauzes may be in the form of woven or knitted gauzes or agglomerated non-woven gauzes akin to those described above for the precious metal catalysts. Any palladium present in a gauze will be able to catch vaporized platinum passing over it, hence the palladium content of the catchment gauze may be from 10 to ≥95% wt, preferably >50%, more preferably >70%. One or more palladium based catchment gauzes may be used. The catchment gauzes may be provided underneath the precious metal catalyst gauzes individually or form a lower or final gauze as part of a precious metal catalyst pad. The catchment gauzes may be knitted, e.g. according to the aforesaid EP-B-0364153 and may form a layer or layers in a precious metal catalyst knitted structure, e.g. a layer in a knitted pad. Alternatively, the palladium-based guard material is woven or knitted into a precious metal ammonia oxidation catalyst gauze by using it as a filament in the weaving or knitting process. Palladium-based guard materials suitable for weaving or knitting into gauze structures are palladium or palladium alloys with nickel (Ni), cobalt (Co) or gold (Au). For example a catchment gauze may be fabricated from a 95:5% wt Pd:Ni alloy. In addition the palladium-based guard material may desirably be formulated to reduce nitrous oxide by-product formation, and may thus preferably contain a small amount, e.g. <5% rhodium (Rh). In particular, palladium gauzes containing amounts of platinum and rhodium may be used. Such gauzes may comprise, for example >92% wt palladium, 2-4% wt rhodium and the remainder platinum, or alternatively comprise 82-83% wt palladium, 2.5-3.5% wt rhodium and the remainder platinum. Ceramic fibers comprising an inert refractory material, such as alumina, zirconia or the like, may also be woven or knitted into catchment gauzes in addition to the palladium-based materials.

The supporting framework for the gauzes may be any currently in use and includes simple girder support arrangements that extend across the vessel and so-called "baskets" in which the precious metal gauzes are supported on the base of a cylindrical unit suspended within the ammonia oxidation vessel.

The invention further provides an ammonia oxidation process comprising the step of passing a gas mixture comprising ammonia, an oxygen containing gas, such as air, and optionally, a methane containing gas through the catalyst structure described herein that comprises an ammonia oxidation catalyst and/or a nitrous oxide decomposition catalyst.

In the oxidation of ammonia to nitric oxide for the manufacture of nitric acid, the oxidation process may be operated at temperatures of 750-1000° C., particularly 850-950° C., pressures of 1 (low pressure) to 15 (high pressure) bar abs., with ammonia in air concentrations of 7-13%, often about 10%, by volume. In the oxidation of ammonia with air in the presence of methane for the manufacture of hydrogen cyanide, the Andrussow Process, the operating conditions are similar although the operating temperatures may be up to 1100-1150° C. The present invention is particularly suited to processes and ammonia oxidation reactors operated at pressures in the range 6-15 bar abs, particularly 7-15 bar g (so-called high pressure plants) because the containment unit may readily be placed in the vessel without having to move or adjust heat recovery means commonly found just below the gauzes in medium pressure and atmospheric plants.

The use of linear structures or mats of catalyst only in localised positions with a catalyst bed is also useful in nitrous oxide abatement catalyst beds, where gas flow channelling and escape of loose pellets potentially present serious performance losses. The supported catalyst pellets may be the same as those used in an ammonia oxidation bed or they may differ in composition, size, and shape or any combination of these. Using a nitrous oxide decomposition catalyst, the process of the present invention may provide aggregate $N_2O$ levels below 1600 ppm, preferably below 600 ppm, more preferably below 500 ppm and most preferably below 200 ppm.

In one embodiment, the catalyst arrangement in the vessel comprises a plurality of flexible linear and/or mat structures of ammonia oxidation catalyst, optionally with loose particulate ammonia oxidation catalyst disposed thereon, on a support mesh comprising a platinum alloy gauze pack, under which is a flexible nitrous oxide abatement catalyst structure supported on a further support mesh which may be of steel, a platinum alloy, or a palladium catchment gauze. Preferably the particulate ammonia oxidation and nitrous oxide decomposition catalyst in the flexible structures is the same and comprises shaped units of mixed metal rare-earth cobalt perovskite catalyst, as described in EP-B-0946290.

Alternatively, hybrid catalyst arrangements comprising a precious metal gauze on top of a particulate ammonia oxidation or nitrous oxide abatement catalyst, for example as described in the aforesaid WO04/096703 and WO04/096702, may be used in which the loose particulate catalysts are replaced with catalyst structures according to the present invention.

This invention offers solutions to a number of problems including;

1. How to stabilise a thin bed of particulate catalyst against the potentially detrimental effects of thermal and mechanical processes that are commonly encountered in commercial ammonia oxidation plants, while achieving a commercially viable reactant conversion efficiency.
2. How to control particulate catalyst migration.
3. How to avoid development of variable catalyst distribution density.
4. The potential to reduce normally inherent problems of light-off common to non metallic ammonia oxidation catalysts.
5. The potential to provide thinner catalyst beds with reduced pressure drop.
6. How to provide a fail-safe ammonia oxidation catalyst arrangement.
7. How to minimize particulate catalyst loss in the event of support mesh failure.
8. How to maintain catalyst retention at the edges of currently available $N_2O$ abatement catalyst beds.

9. How to simply recover and separate mixed catalysts from the reactor for metal recovery and/or recycling.

In FIG. 1, a linear catalyst structure 10 comprises a plurality of ammonia oxidation catalyst pellets 12 of a cobalt-based ammonia oxidation catalyst strung on a metal wire 14 formed from a steel alloy. The ammonia oxidation catalyst, which also functions as a nitrous oxide decomposition catalyst, is a Co perovskite prepared according to examples 2 and 3 of EP-B-0946290. The pellets have a diameter of about 10 mm. The catalysts in this embodiment are free to move along the wire so that they may separate as the wire is coiled.

Figure 2:
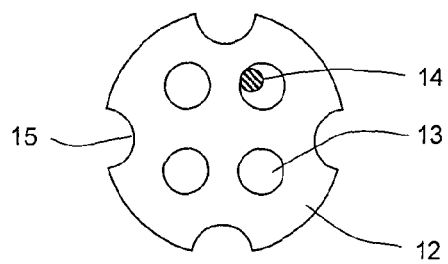
FIG. 2 depicts a cross-section through one of the shaped catalyst units in the embodiment of FIG. 1.

In FIG. 2, the cross section of the pellet 12 is in the form of a symmetrical 4-hole and lobed cylinder. The holes 13 are arranged in a square pattern, and the lobes are formed by four co-axial channels 15 in the wall of the cylinder wall equidistant between adjacent holes. Only one support wire 14 passing through one hole 13 is depicted, but one or more wires may be strung through each through-hole.

Figure 3:
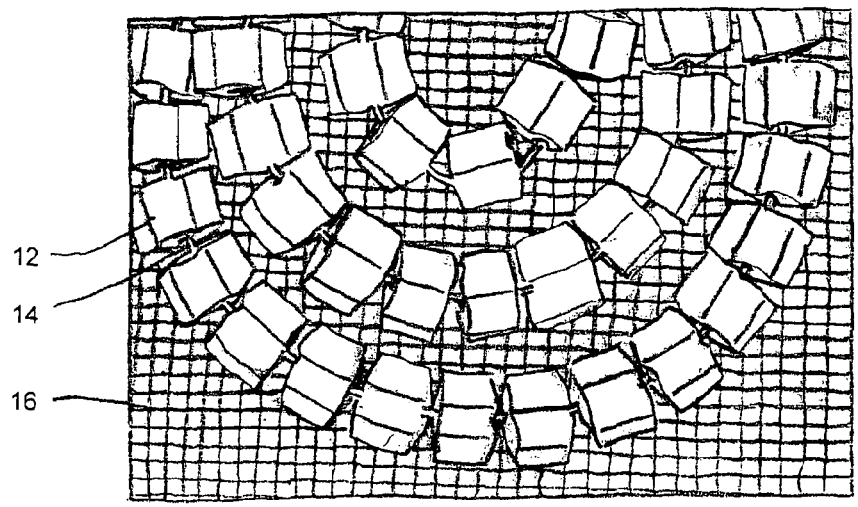
FIG. 3 depicts the embodiment of FIG. 1 coiled and disposed on a steel mesh.

In FIG. 3, the linear structure comprising the plurality of pellets 12 on support wire 14 is coiled and disposed on a steel mesh 16 to which it may be fixed by means of wire staples (not shown).

Figure 4:
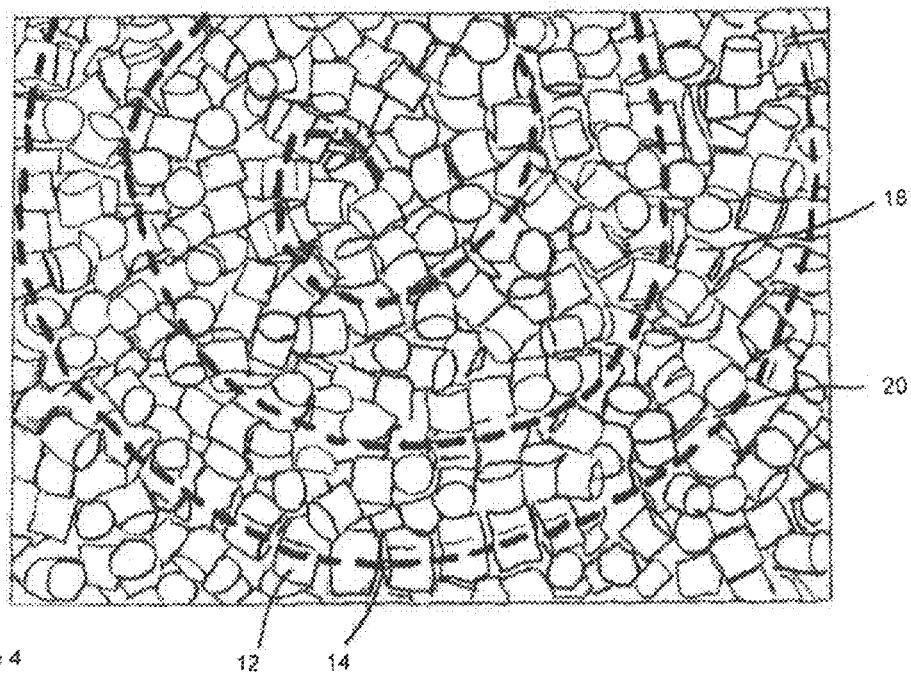
FIG. 4 depicts a fixed bed comprising the embodiment in a coiled structure supported on a steel mesh of FIG. 3 in combination with a loose particulate nitrous oxide decomposition catalyst.

In FIG. 4, loose cylindrical pellets 18 of a nitrous oxide abatement catalyst are combined with the mesh-supported coiled structure of FIG. 3 to form a fixed bed arrangement. A dashed line is superimposed on the figure to indicate the position of the coiled catalyst structure within the bed. Wire staples 20 have been used to fix the coiled structure in place on the support mesh.

Figure 5:
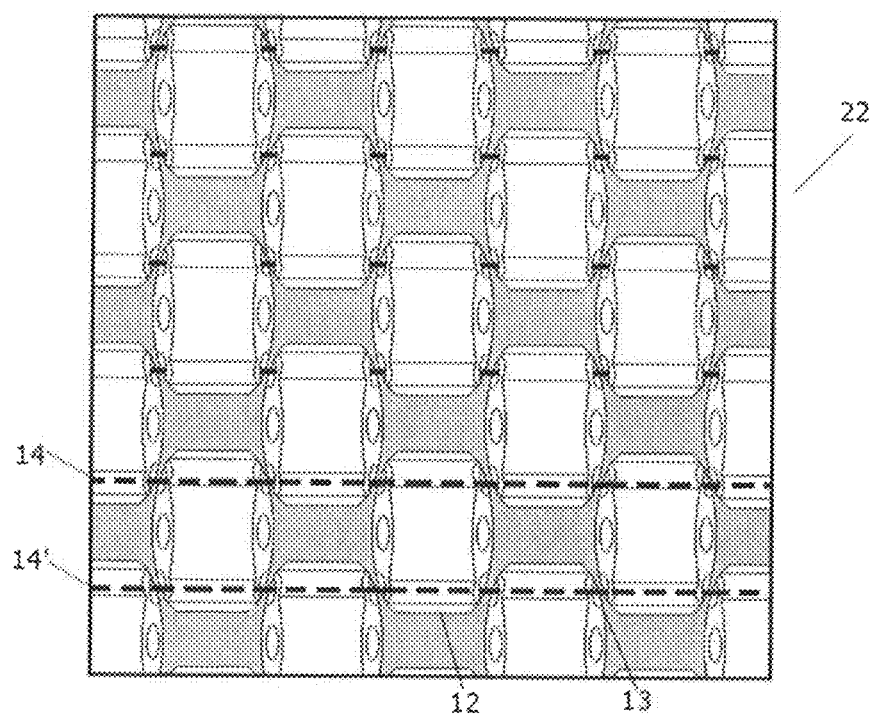
FIG. 5 depicts a mat structure formed from a plurality of linear structures according to the embodiment of FIG. 1.

In FIG. 5, a plurality of linear structures 10 of FIG. 1 have been aligned with parallel support wires 14 and 14' to form a mat structure 22. The catalyst pellets 12 are arranged in an interlocking brick-pattern by passing support wires 14 and 14' through two of the four holes 13 in the catalyst pellets. Dashed lines are superimposed on FIG. 5 to indicate the position of the support wires 14 and 14'.

What is claimed:

1. An ammonia oxidation process comprising the step of passing a gas mixture comprising ammonia, an oxygen containing gas and optionally a methane containing gas through a catalyst structure comprising an ammonia oxidation catalyst and/or a nitrous oxide decomposition catalyst, wherein the catalyst structure comprises a plurality of shaped catalyst units supported on one or more members in a spaced relationship that avows the structure to flex, wherein the shaped catalyst units have maximum and minimum dimensions in the range 1.5 to 20 mm, and an aspect ratio less than 3, the supporting members are metal or ceramic wires, and the separation of adjacent shaped catalyst units is in the range 1-10 mm, wherein the catalyst structure is disposed on a support mesh.

2. A process according to claim 1 wherein a particulate inert material is included in the structure.

3. A process according to claim 1 wherein two or more different catalyst particle sizes are present.

4. A process according to claim 1 wherein the shaped catalyst units have 1 to 10 through-holes.

5. A process according to claim 1 wherein the catalyst units are cylindrical pellets having 1-5 through holes.

6. A process according to claim 1 wherein the supporting members comprise steel or a platinum alloy.

7. A process according to claim 1 wherein the support members run both externally and internally with regard to the shaped catalyst units.

8. A process according to claim 1 wherein two or more linear catalyst structures, in which the catalyst units are the same or different, are connected to each other to form a mat structure.

9. A process according to claim 8 wherein two or more mat structures are arranged in layers to form a three-dimensional bed structure.

10. A process according to claim 9 wherein the support members in the mat structures are connected to each other by connectors.

11. A process according to claim 1 wherein the support mesh is made of steel, platinum, a platinum alloy or a palladium alloy, and comprises a single layer or a plurality of layers.

12. A process according to claim 1 wherein the catalyst structure is fixed to the support mesh using connectors.

13. A process according to claim 1 further comprising loose catalyst pellets.

14. A process according to claim 1 further comprising one or more precious metal ammonia oxidation catalyst gauzes.

* * * * *